April 23, 1935.  J. H. M. AWREY  1,999,073
GAUGE
Filed Dec. 6, 1933    2 Sheets-Sheet 1
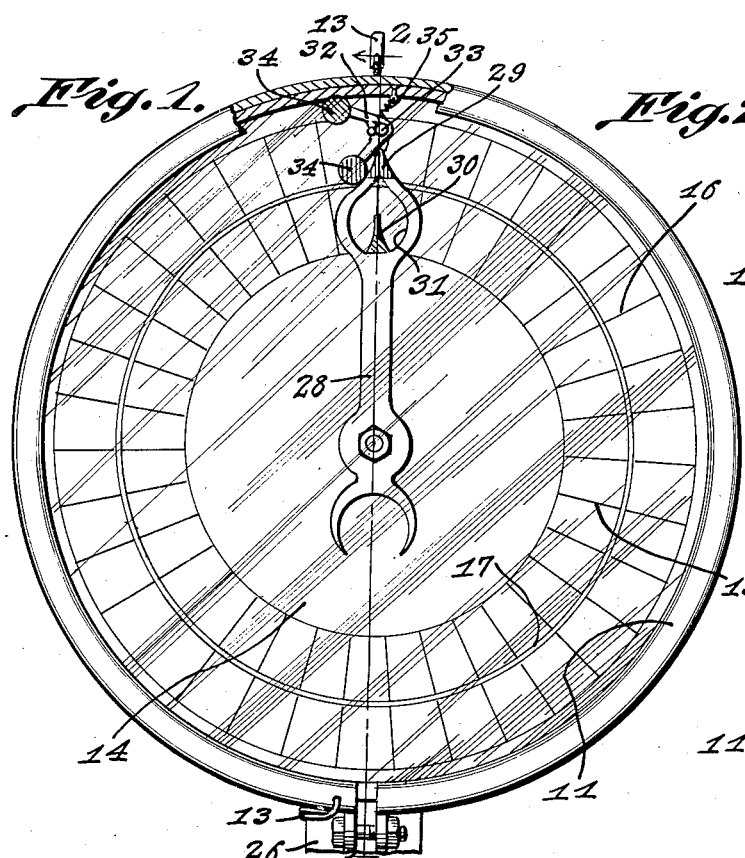
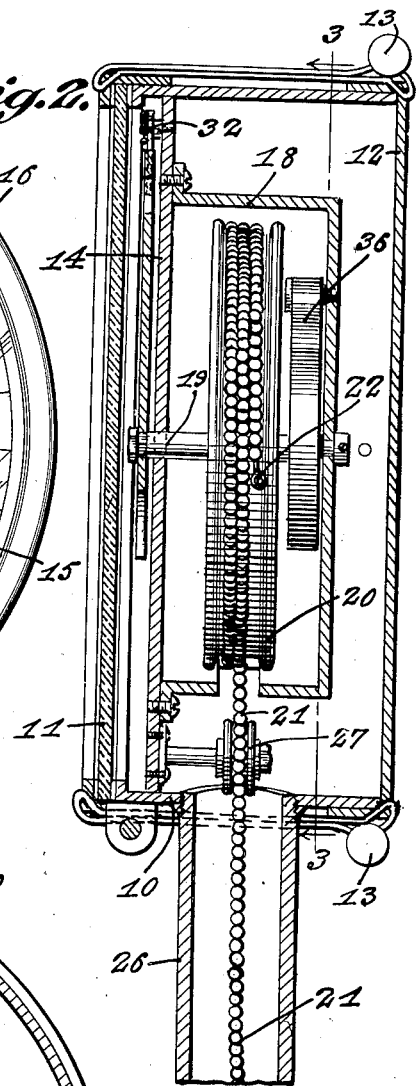
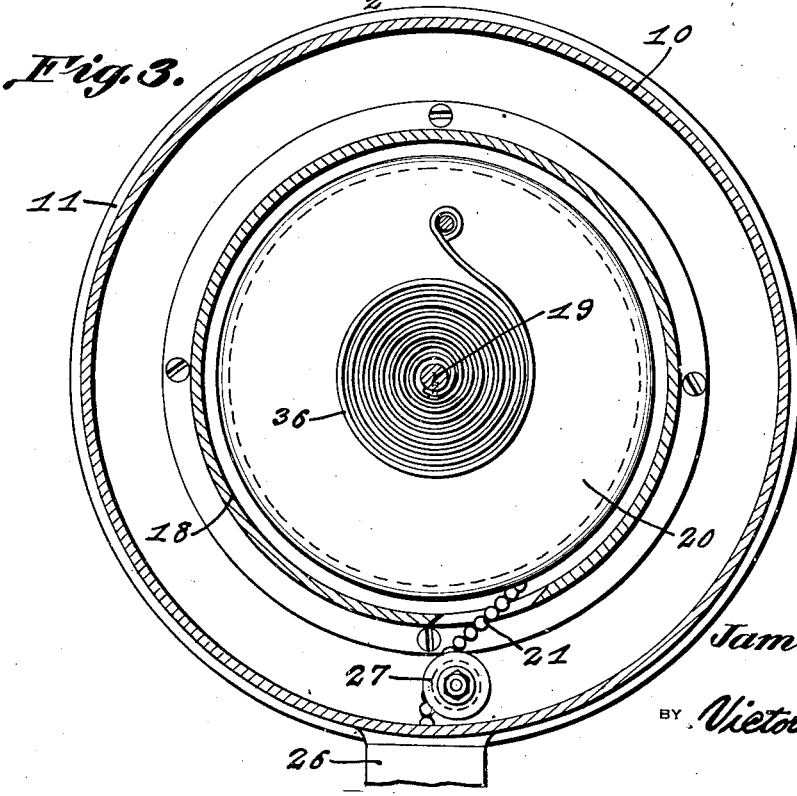
James H. M. Awrey, INVENTOR
BY Victor J. Evans & Co.
ATTORNEY April 23, 1935.　　　J. H. M. AWREY　　　1,999,073
GAUGE
Filed Dec. 6, 1933　　　2 Sheets-Sheet 2
*Fig. 4.*
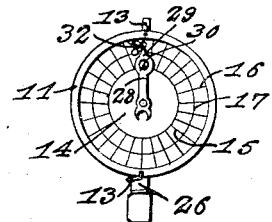
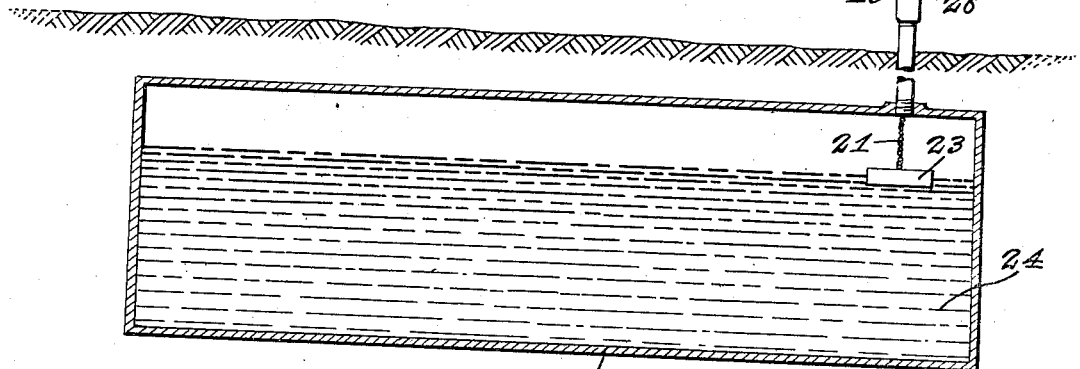
*Fig. 5.*
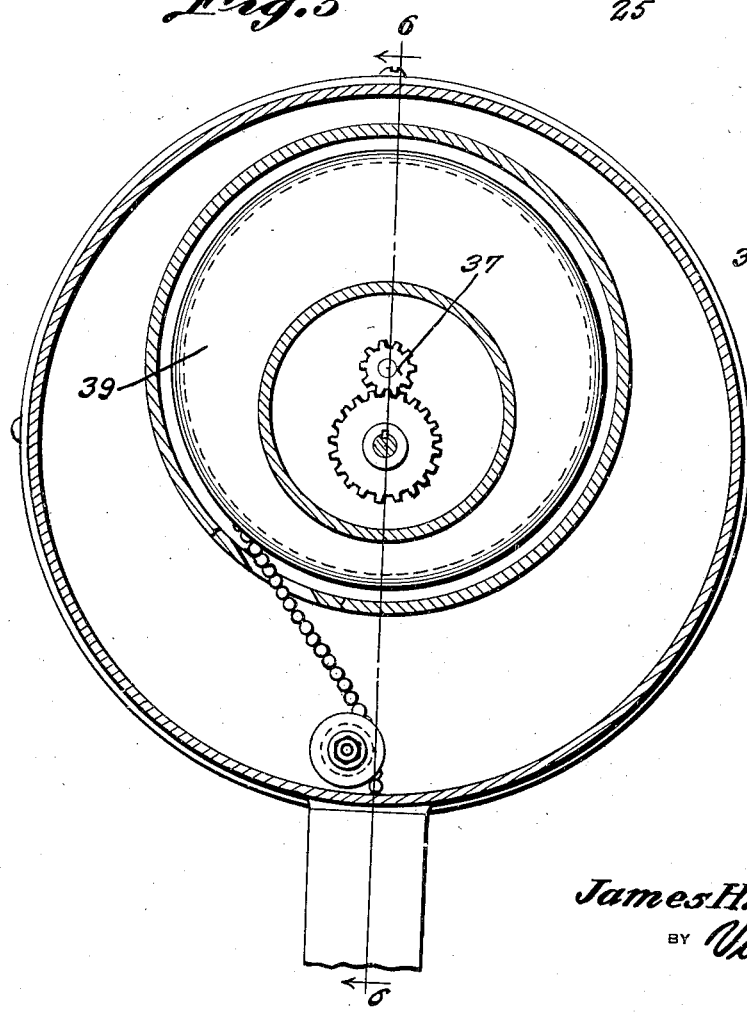
*Fig. 6.*
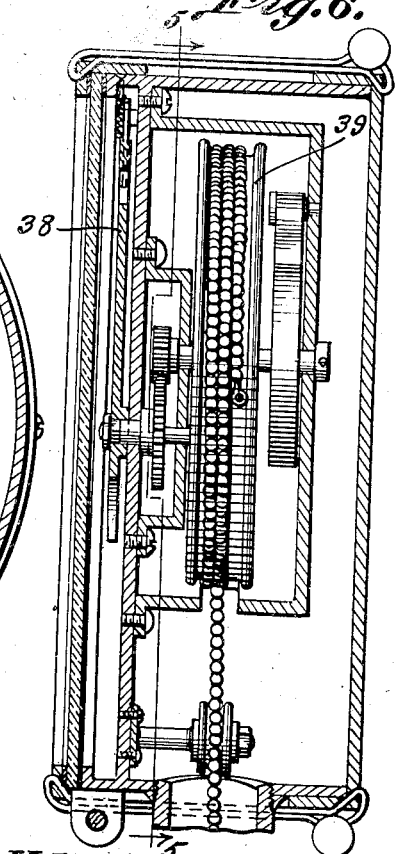
James H. M. Awrey, INVENTOR
BY Victor J. Evans & Co.
ATTORNEY Patented Apr. 23, 1935

1,999,073

UNITED STATES PATENT OFFICE 1,999,073

GAUGE

James H. M. Awrey, Hawley, Minn.

Application December 6, 1933, Serial No. 701,184

2 Claims. (Cl. 116—129)

The invention relates to a gauge and more particularly to a liquid gauge for storage tanks.

The primary object of the invention is the provision of a gauge of this character, wherein the quantity of liquid within a storage tank can be determined, and the indicator hand controlled by a float within the tank traverses a dial having concentric scales and cooperates with a trip signal indicative of a determined number of revolutions of the indicator hand upon the dial, thus enabling a definite and more accurate reading of the gauge.

Another object of the invention is the provision of a gauge of this character, wherein an indicator hand is automatically controlled under the influence of liquid within a storage tank, it being operated through a float flexibly connected with a drum and such hand coacts with a signal of a trip type signifying the number of revolutions of the hand with respect to a dial having separate scale readings, the indicator hand being provided with double pointers for the respective scale readings, the gauge being of novel construction in its entirety.

A further object of the invention is the provision of a gauge of this character which is simple in construction, thoroughly reliable and efficient in its operation, readily and easily readable, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a front elevation, partly broken away, of a gauge constructed in accordance with the invention and its indicator hand being normally at zero or starting.

Figure 2 is a sectional view on the line 2—2 of Figure 1 looking in the direction of the arrows.

Figure 3 is a sectional view on the line 3—3 of Figure 2 looking in the direction of the arrows.

Figure 4 is a vertical sectional view through a storage tank showing liquid therein and the gauge applied.

Figure 5 is a sectional view on the line 5—5 of Figure 6 showing a slight modification of gauge.

Figure 6 is a sectional view on the line 6—6 of Figure 5 looking in the direction of the arrows.

Similar reference characters indicate corresponding parts throughout the several views in the drawings.

Referring to the drawings in detail, particularly Figures 1 to 4 inclusive, illustrative of the preferred embodiment of the invention, there is shown a gauge comprising a casing 10 of circular formation having a releasable glass paneled front 11 and a removable solid back 12, respectively, the front and back being telescoped upon the casing 10 and held secure by seals 13.

Arranged within the casing close to the glass paneled front 11 is a dial 14 having the concentrically circular arranged scales 15 and 16, respectively, these being divided by a ring-like demarcation 17 therebetween and such scales being visible through the glass panel of the front 11 from without the casing 10. Centrally journaled in the dial 14 and in a suitable housing 18 suitably supported rearwardly thereof and by the same is an arbor or axle 19 carrying a windlass 20, on or from which is to be wound or unwound a chain or cable 21, one end of the same being made fast at 22 to the windlass and the other end carrying a float 23 buoyant upon a quantity of liquid 24 within a storage tank 25. The chain or cable 21 is trained centrally through a stand pipe or tube 26 supporting the casing 10 elevated above the tank 25 and connected with a suitable vent therein. The cable or chain 21 at the point of communication of the stand pipe or tube 26 with the casing 10 traverses an idle wheel 27 which centers the depending portion of the chain or cable 21 in said pipe or tube.

Mounted on the arbor or shaft 19 at its front end is an indicator hand 28 adapted to traverse the dial 14 for coaction with the scales 15 and 16 on the exposed outer face of such dial. The hand 28 is provided with the pointers 29 and 30, respectively, the latter being within an opening 31 in said hand and coacting with the scale 15, while the pointer 29 coacts with the scale 16.

Pivoted to the dial 14 at the zero point of the scales 15 and 16 is a bell crank-like or inverted V-shaped tripping indicator or signal 32, the pivot 33 therefor being at the crotch of said indicator or at the center of gravity thereof or midway with respect to the spread of the arms of the same. These arms of the indicator 32 have disk-like terminals 34, which differ in color and one terminal is of the same color as the pointer 29 and the other of the same color as the pointer 30. The hand 28, on traversing the dial 14, automatically trips the indicator 32, swinging one terminal 34 upwardly with the other terminal lowermost thereto. This indicator 32 has centrally connected to it below the center axis a tensioning spring 35 which is also connected off center with respect to said indicator 32 with the casing 10 so that the indicator will snap past its axis to either side thereof to hold the terminals 34 in their thrown position on the tripping of the indicator 32 by the hand 28. If the hand 28 moves clockwise and assuming that the indicator 32 is in the position as shown in Figure 1 when such hand completes a revolution of the dial 14 it will contact with the terminal 34 in its path, shifting the same to the position reverse to that shown in said Figure 1, thereby indicating to the observer of the gauge the fact that the said hand has made one complete revolution and thus the pointer 30 should be read in connection with the scale 15 for ascertaining the quantity of liquid within the tank 25. If the hand 28 traverses less than a complete revolution of the dial 14 then the indicator 32 will be in the normal position shown in Figure 1 and thus the pointer 29 will be read in conjunction with the scale 16 to determine the quantity of liquid within the tank 25. The hand 28 is susceptible of two complete revolutions of the dial 14 to determine that the tank 25 has been emptied. When the indicator is in the reverse position to that shown in Figure 1 of the drawings on a counterclockwise movement of the hand 28 the said indicator will be shifted to that position shown in Figure 1, this being effected by a single revolution of the hand 28 in the counterclockwise movement thereof.

Connected with the arbor or axle 19 and the housing 18 is a counterbalancing coiled spring 36 for the chain or cable 21, the spring being wound on the letting out of the chain or cable 21 for its rewinding upon the windlass 22 on the rise of the liquid within the tank 25 when the latter is filled and this spring will take up any slack of the chain or cable 21 between the float 23 and the windlass 20 upon which such cable or chain is wound or unwound.

In Figures 5 and 6 of the drawings there is shown a slight modification of the invention, wherein a reducing gear train 37 is arranged between the indicator hand 38 and the windlass 39, this being required to assure two complete revolutions of the indicator hand 38 when a gauge is employed for service with tank capacities exceeding one thousand gallons, while the direct connection between the indicator hand and the windlass, as shown in Figures 1 to 4 of the drawings, is for a one thousand gallon capacity tank or less, so that in both the preferred and modified forms the indicator hand will traverse the dial but twice and the indicator 32 will signify either scale to be read in conformity with the revolutions of such indicator hand. A single revolution of the indicator hand trips the indicator 32 either under clockwise or counterclockwise travel of such hand, the latter being moved counterclockwise on the resetting operation of the gauge.

What is claimed is:

1. The combination of a dial having independent scales concentrically disposed with respect to each other, a revolving hand traversing the dial and having pointers for the respective scales and a double arm indicator pivoted for arcuate swinging movement and located for engagement by the hand for the automatic tripping thereof by the latter when the said hand traverses the dial to identify the scale to be read according to the travel of the hand upon the dial.

2. The combination of a dial having independent scales, a hand traversing the dial and having pointers for the respective scales, a double arm indicator pivoted for arcuate swinging movement and located for engagement by the hand for the automatic tripping thereof by the latter when the said hand traverses the dial to identify the scale to be read according to the travel of the hand upon the dial, and a spring active upon the double arm indicator for effecting snapping action thereof to either side of its axis of movement.

JAMES H. M. AWREY.